(12) United States Patent
Loganathan et al.

(10) Patent No.: US 12,498,942 B1
(45) Date of Patent: Dec. 16, 2025

(54) OUT-OF-BAND (OOB) CONFIGURATION OF FIRMWARE SETTINGS USING MAPPING IDENTIFIERS (IDs) FOR FIRMWARE SETUP QUESTIONS

(71) Applicant: AMERICAN MEGATRENDS INTERNATIONAL, LLC, Duluth, GA (US)

(72) Inventors: Anandakrishnan Loganathan, Johnscreek, GA (US); Muthuselvam R, Kottucherry (IN)

(73) Assignee: AMERICAN MEGATRENDS INTERNATIONAL, LLC, Duluth, GA (US)

(*) Notice: Subject to any disclaimer, the term of this patent is extended or adjusted under 35 U.S.C. 154(b) by 224 days.

(21) Appl. No.: 18/366,994

(22) Filed: Aug. 8, 2023

(51) Int. Cl.
| | | |
|---|---|---|
| *G06F 9/00* | (2018.01) | |
| *G06F 9/4401* | (2018.01) | |
| *G06F 9/445* | (2018.01) | |

(52) U.S. Cl.
CPC ........ *G06F 9/44505* (2013.01); *G06F 9/4401* (2013.01)

(58) Field of Classification Search
CPC ............................ G06F 9/44505; G06F 9/4401
See application file for complete search history.

(56) References Cited

U.S. PATENT DOCUMENTS

| | | | |
|---|---|---|---|
| 9,836,463 B2 | 12/2017 | Bolen et al. | |
| 10,467,015 B2 | 11/2019 | Dasar et al. | |
| 10,956,170 B2* | 3/2021 | Dasar | G06F 3/0658 |
| 11,789,821 B1* | 10/2023 | Ladkani | G06F 9/44505 |
| | | | 714/48 |
| 2012/0136888 A1 | 5/2012 | Mahmoud et al. | |
| 2018/0150302 A1 | 5/2018 | Chuang et al. | |
| 2020/0301714 A1 | 9/2020 | Dasar et al. | |
| 2024/0231793 A9* | 7/2024 | Xie | G06F 8/654 |

FOREIGN PATENT DOCUMENTS

WO 2016082755 A1 6/2016

* cited by examiner

*Primary Examiner* — Tammara R Peyton
(74) *Attorney, Agent, or Firm* — Newport IP, LLC; Scott Y. Shigeta

(57) ABSTRACT

A firmware transmits remote firmware setup user interface ("UI") resources to a baseboard management controller ("BMC"). The BMC utilizes the remote firmware setup UI resources to generate an out-of-band ("OOB") firmware setup UI that can be utilized to modify values associated with configuration settings maintained by the firmware. The remote firmware setup UI resources include a first unique string identifier ("ID") for a first instance of a device and a first unique mapping ID associated with the first unique string ID. When a request is received from the BMC to modify a value associated with a configuration setting, the firmware determines whether the request includes the first unique mapping ID. If the request includes the first unique mapping ID, the firmware updates the value of a first configuration setting that is associated with the first unique mapping ID.

14 Claims, 7 Drawing Sheets

OUT-OF-BAND (OOB) CONFIGURATION OF FIRMWARE SETTINGS USING MAPPING IDENTIFIERS (IDs) FOR FIRMWARE SETUP QUESTIONS

BACKGROUND

Some computing systems are configured with a baseboard management controller ("BMC") for performing various management functions, including providing functionality for allowing a user to remotely configure firmware settings through an out-of-band ("OOB") firmware setup user interface ("UI"). However, limitations of current BMC and firmware implementations prevent users from remotely configuring individual instances of the same device with different values. Rather, current implementations require that individual instances of the same device be configured using the same value.

It is with respect to these and other considerations that the disclosure made herein is presented.

SUMMARY

Technologies are described herein for OOB configuration of firmware settings using mapping identifiers ("IDs") for firmware setup questions. Through implementations of the disclosed technologies, a firmware can enable individual instances of the same device to be configured differently through an OOB firmware setup UI. Technical benefits other than those specifically mentioned herein can also be realized through an implementation of the disclosed technologies.

In order to provide the functionality described herein, a firmware transmits remote firmware setup UI resources to a BMC. The BMC utilizes the remote firmware setup UI resources to generate an OOB firmware setup UI that can be utilized to modify values associated with configuration settings maintained by the firmware.

In an embodiment, the remote firmware setup UI resources include a first unique string identifier ("ID") for a first instance of a device and a first unique mapping ID associated with the first unique string ID. The first unique mapping ID is an alphanumeric string identifying a respective device instance or other object for which a value of a corresponding configuration setting can be altered, in an embodiment. The first unique mapping ID and is defined using the UEFI Platform Configuration Language, in an embodiment.

When a request is received from the BMC to modify a value associated with a configuration setting, the firmware determines whether the request includes the first unique mapping ID. If the request includes the first unique mapping ID, the firmware updates the value of a first configuration setting that is associated with the first unique mapping ID.

In an embodiment, the remote firmware setup UI resources also include a second unique string ID for a second instance of the device and a second unique mapping ID associated with the second unique string ID. The second unique mapping ID is also an alphanumeric string identifying a respective device instance or other object for which a value of a corresponding configuration setting can be altered and is specified using the UEFI Platform Configuration Language, in an embodiment.

The firmware can determine that a request received from the BMC includes the second unique mapping ID. In response thereto, the firmware can update the value of a second configuration setting for the firmware based on the request, the second unique mapping ID being associated with the second configuration setting for the firmware.

In an embodiment, a mapping ID generator generates the first unique mapping ID and the second unique mapping ID based on one or more Unicode resource files. The mapping ID generator can also generate the first unique string ID and the second unique string ID. In an embodiment, the first unique string ID is generated by appending a first numerical value to an original first unique string ID and the second unique string ID is generated by appending a second numerical value to an original second unique string ID.

It is to be appreciated that the above-described subject matter can be implemented as a computer-controlled system or apparatus, a computer process, a computing system, or as an article of manufacture such as a non-transitory computer-readable storage medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for OOB configuration of firmware settings using mapping IDs for firmware setup questions. As discussed briefly above, through implementations of the disclosed technologies a firmware can be provided that enables instances of devices to be configured more granularly through an OOB firmware setup UI than previously possible. Technical benefits other than those specifically mentioned herein can also be realized through an implementation of the disclosed technologies. Additional details regarding these aspects will be provided below with regard to FIGS. 1-7.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations, or examples. The drawings herein are not drawn to scale. Like numerals represent like elements throughout the several figures (which might be referred to herein as a "FIG." or "FIGS.").

Figure 1:
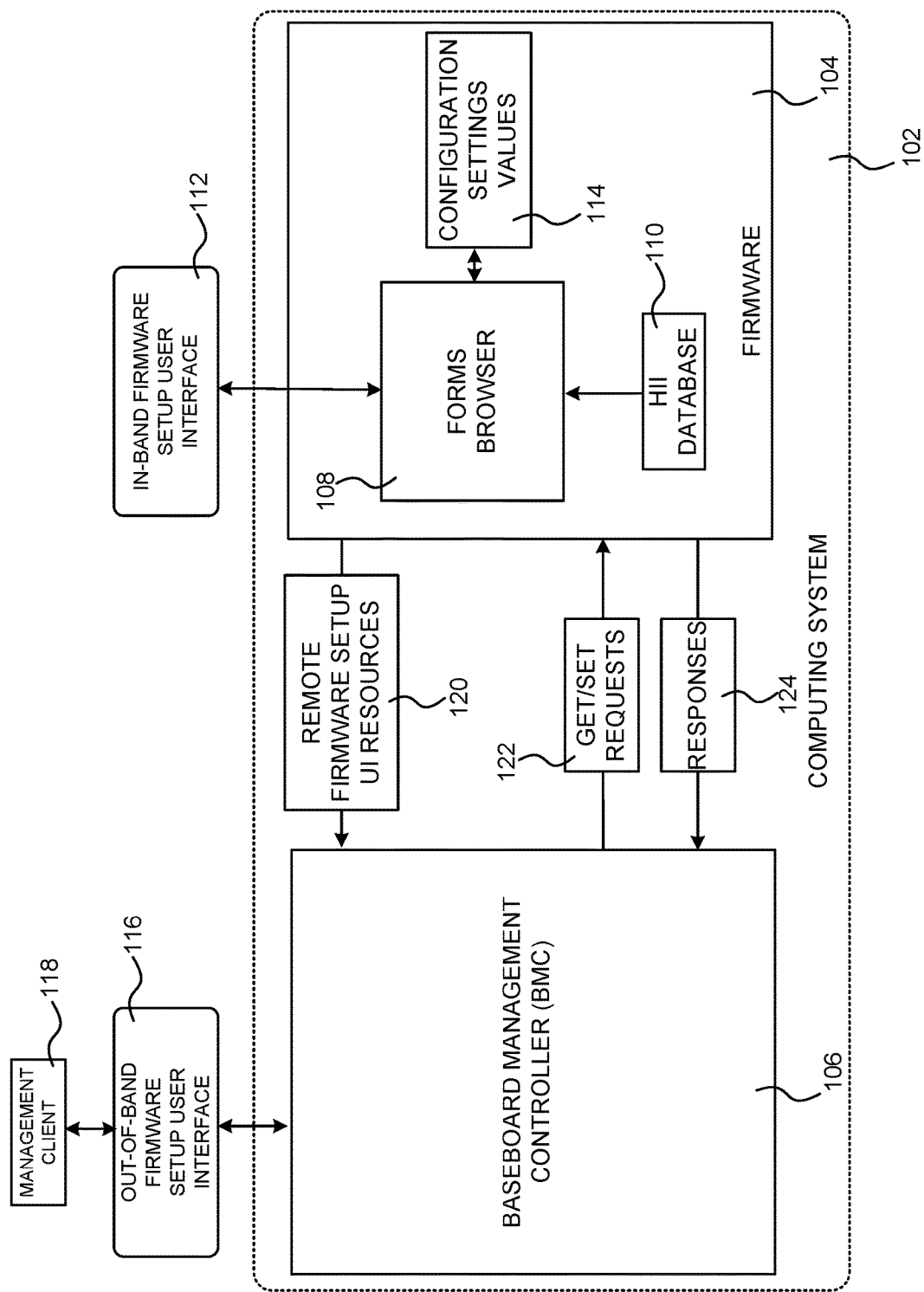
FIG. 1 is a software architecture diagram illustrating aspects of a mechanism disclosed herein for OOB configuration of firmware settings using mapping IDs for firmware setup questions, according to one embodiment.

FIG. 1 is a software architecture diagram illustrating aspects of a mechanism disclosed herein for OOB configuration of firmware settings using mapping IDs for firmware setup questions, according to one embodiment. Aspects of the disclosed functionality are provided by a computing system 102 that executes a firmware 104. The firmware 104, among other things, provides a set of software routines that configure the computing system 102 prior to boot time, boot an operating system ("OS") on the computing system 102, and provide runtime services.

In an embodiment, the firmware 104 is a UEFI Specification-compliant firmware that is configured to provide and/or utilize aspects of the technologies disclosed herein. The UEFI Specification describes an interface between an OS and a UEFI Specification-compliant firmware, such as the firmware 104. The UEFI Specification also defines an interface that the firmware 104 can implement and an interface that an OS can use while booting. The UEFI Specification also defines a way for an OS and the firmware 104 to exchange information to support the OS boot process.

The term "UEFI Specification" as used herein refers to both the EFI Specification developed by INTEL CORPORATION and the UEFI Specification managed by the UEFI FORUM. Accordingly, the firmware 104 might be referred to herein as the UEFI Specification-compliant firmware 104, the UEFI-compliant firmware 104, the UEFI firmware 104, or simply the firmware 104. The embodiments disclosed herein can also be utilized with other types of firmware. Additional details regarding the configuration and operation of an illustrative UEFI Specification-compliant firmware 104 are provided below with regard to FIG. 6.

As described briefly above, the firmware 104 also provides an in-band firmware setup UI 112 (which might be referred to herein as the "setup menu 112") that can be accessed through the firmware 104, typically at the time the computing system 102 is powered on. For example, a local user of the computing system 102 might type a pre-defined key combination on a keyboard connected to the computing system 102 just after the computing system 102 has been powered on. In response thereto, the firmware 104 displays the setup menu 112. Details regarding the mechanism utilized by the firmware 104 to display the setup menu 112 are provided below.

Through the setup menu 112, a user can specify values 114 for various configuration settings that are utilized to control aspects of the operation of the computing system 102. Examples of configuration settings that can be specified through the setup menu 112 include, but are not limited to, boot order, firmware setup defaults, a firmware password, the current date and time, hard drive settings, processor and memory settings, and others. The values 114 for the configuration settings are stored in a non-volatile memory so that they are accessible to the firmware 104 at boot time of the computing system 102 even after power has been removed from the computing system 102.

The firmware 104 also includes an executable component, such as a module or application, which might be referred to herein as the "forms browser 108" or "setup browser 108," that renders the setup menu 112 at run time (i.e., execution time of the firmware 104). In one embodiment, the setup browser 108 utilizes the contents of a human interaction infrastructure ("HII") database 110 to generate the setup UI 112. In particular, the setup browser 108 utilizes binary setup data that defines the various pages (which might also be referred to herein as "forms") and UI controls on the pages that make up the setup menu 112. The HII database 110 acts as a repository for configuration and UI resources, including forms, fonts, strings, images, animations, and keyboard layouts. The firmware 104 and individual drivers can install, modify, and remove these resources.

The structure and contents of the setup menu 112 are defined by a developer of the firmware 104 using the Visual Form Representation ("VFR") language, in one embodiment. A compiler (not shown in FIG. 1) can receive a text file defining the setup menu 112 using VFR as input and output an Internal Forms Representation ("IFR") version of the setup menu 112. Various methods can be utilized to define the VFR, some of which are described in the VFR Programming Language Specification, which is available from the TIANOCORE community, and which is expressly incorporated herein by reference in its entirety.

The IFR representation defines the forms and UI controls contained in the setup menu 112 provided by the firmware 104. In some embodiments, the setup browser 108 consumes the IFR representation to render the setup menu 112 at runtime. Additional details regarding the generation of IFR for the setup menu 112 can be found in Chapter 31.2.5 (Forms) of the UEFI Specification (2.6 Human Interface Infrastructure Overview). Additional details regarding the content and structure of the HII database 110 are provided below with respect to FIGS. 2 and 3.

In an embodiment, the computing system 102 also includes a BMC 106. As discussed briefly above, a BMC 106 is a specialized service processor that, among other things, monitors the physical state of a computer, such as the computing system 102, using sensors, and communicates with a system administrator through an OOB network (not shown in the FIGS.) connected to a remote management client 118.

In an embodiment, communication between the firmware 104 and the BMC 106 is enabled through implementation of an interface that is compatible with the REDFISH management standard. REDFISH is a successor to previous manageability interfaces created by the Distributed Management Task Force ("DMTF"). REDFISH is an open industry standard specification and schema for simple, modern, and secure management of scalable platform hardware, such as server computers located in data centers.

The REDFISH specification and schema specifies a REST interface and utilizes JAVASCRIPT object notation ("JSON") and the Open Data Protocol ("OData") to integrate management solutions within existing toolchains. Although the embodiments disclosed herein are described primarily as utilizing the REDFISH management standard, other specifications can be utilized to establish communications between the BMC 106 and the firmware 104 in other embodiments.

The REDFISH-compatible interface described above is utilized in one embodiment to remotely configure the firmware 104 from the management client 118. In order to provide this functionality, the firmware 104 of the computing system 102 transmits remote firmware setup UI resources 120 that includes data for generating an OOB firmware setup UI 116 over the REDFISH-compatible interface. The OOB firmware setup UI 116 can be implemented as a graphical user interface ("GUI"), such as a web page, a command line interface ("CLI"), or another type of UI that provides functionality for viewing the current values 114 of configuration settings for the firmware 104 and allowing an OOB user to provide new values 114 for configuration settings for use in configuring the firmware 104.

The remote firmware setup UI resources 120 provided by the firmware 104 to the BMC 106 can include, for instance, data defining the valid questions for defining values 114 for configuration settings for the firmware 104 and the current values for the configuration settings corresponding to each of the questions. The questions can be presented in the OOB firmware setup UI 116. The remote firmware setup UI resources 120 can also include resources for use by the BMC 106 in generating the OOB firmware setup UI 116. For example, and without limitation, the remote firmware setup UI resources 120 can include HTML, JAVASCRIPT, and other resources that can be utilized to present the questions in the OOB firmware setup UI 116 and to receive new values 114 for the firmware configuration settings from the BMC 106.

As mentioned above, the BMC 106 receives the data in the remote firmware setup UI resources 120 and utilizes this data to generate the OOB firmware setup UI 116 for use by remote management clients 118. For example, and without limitation, the OOB firmware setup UI 116 can be utilized to submit new values 114 for configuration settings for the firmware 104. The BMC 106 can receive the new values for the configuration settings from the OOB firmware setup UI 116 and transmit the new values for the configuration settings to the firmware 104 in a set request 122 described above. In a similar fashion, the BMC 106 can also obtain current values 114 for the configurations settings from the firmware 104 through the use of a get request 122.

At boot time of the computing system 102, the firmware 104 can query the BMC 106 to determine if new values 114 for the firmware configuration settings are available. If new values 114 are available, the firmware 104 receives the new values 114 for the configuration settings from the BMC 106 and configures the firmware 104 with the new values 114 for the configuration settings. The firmware 104 can request the new values from the BMC 106 following a reboot of the computing system 102. In turn, the BMC 106 can transmit the new values 114 for the configuration settings to the firmware 104 over the REDFISH-compatible interface following the reboot. If any of the new values 114 of the configuration settings are not applied for any reason, the firmware 104 can transmit a response 124 identifying the un-applied values to the BMC 106.

It is to be appreciated that FIG. 1 and the other FIGS. have been simplified for discussion purposes, and that many other software and hardware components can be utilized to implement the functionality disclosed herein. For example, and without limitation, various networks and networking components can be utilized to connect the management client 118 to the BMC 106.

Figure 2:
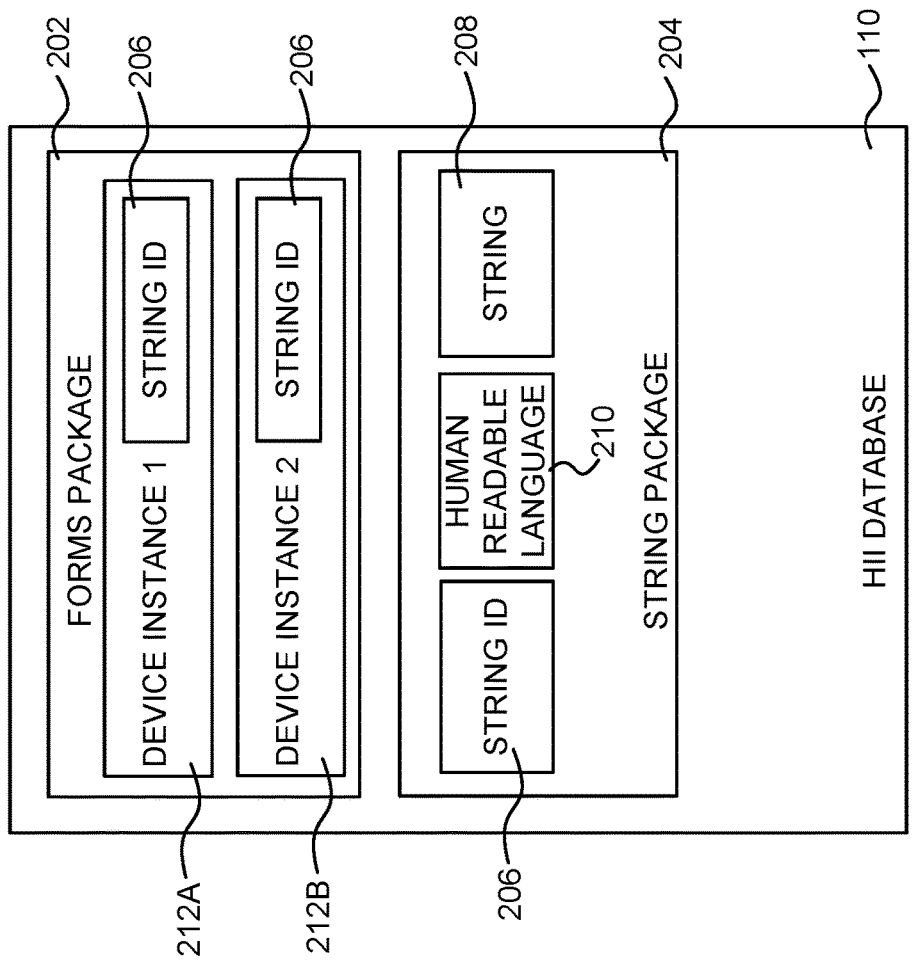
FIG. 2 is a data structure diagram showing aspects of the configuration and contents of a conventional HII database.

FIG. 2 is a data structure diagram showing aspects of the configuration and contents of a conventional HII database 110. As discussed briefly above, the HII database 110 acts as a repository for configuration and UI resources, including forms, fonts, and strings. The firmware 104 and individual drivers contained therein can install, modify, and remove these resources.

As also discussed briefly above, the firmware 104 includes a forms browser 108 that utilizes the contents of the HII database 110 to render the setup menu 112. The setup menu 112 provides a UI where pages, also referred to as forms, defined by the HII database 110 are displayed and input from a user is acquired in order to update values 114 of configuration settings for the computing system 102.

Forms information is stored in a forms package, such as the forms package 202. The forms package 202 can include multiple form sets, and each form set can include multiple forms. Alpha-numeric text displayed within a form is included at one or more corresponding string packages 204. Each string package 204 includes text in one human-readable language. Multiple languages can be supported by providing string packages 204 corresponding to each of the desired human-readable languages. In this way, configuration data administered via the forms packages 202 can be maintained in a language-independent manner, while the configuration data and setup UI 112 can be presented to a user in a desired human-readable language.

Objects referenced within a form package 202 are assigned a unique string ID. The string ID can be used to retrieve a string associated with the referenced object from a corresponding string package 204. For example, a string 208 associated with a first device instance referenced by an entry 212A in the forms package 202 using the string ID 206 can be retrieved from the string package 204 using the string ID 206. As shown in FIG. 2, an entry 210 associated with each string 208 specifies the relevant human-readable language.

Through the use of this mechanism, each firmware configuration setting that can be modified through the setup menu 112 can be associated with an HII question. An HII question is a type of HII statement that has a value, and the value 114 corresponds to a configuration setting for the computing system 102. A form, included in the forms package 202, may present one or more questions and an interface (i.e., the setup menu 112) though which a user or an application program can select between a set of provided configuration options. For example, an HII question may represent an option to enable or disable a Universal Serial Bus ("USB") port.

As discussed briefly above, each HII question has an associated string ID 206 that can be used to retrieve a corresponding string 208 from any of a set of a set of available string packages 204 associated with the forms package 202. A question may include one or more options representing a selection of values associated with the question. Like other objects referenced by a form, each option is associated with a string 208 stored in the string package 204 and referenced by a unique string ID. Thus, a form defined in a forms package 202 can refer to questions, configuration settings, values, etc. in a language-independent manner by instead referencing these objects within a form using a respective string ID, such as the string ID 206.

In conventional implementations, such as that shown in FIG. 2, forms defined in the HII database 110 utilize the same string ID for all of the available instances of the same configurable device. In FIG. 2, for example, an entry 212A in the forms package 202 for a first instance of a device utilizes the string ID 206 to reference the string 208 for the portion of the setup menu 112 for the first instance of the device. Another entry 212B in the forms package 202 for a second instance of the same device utilizes the same string ID 206 to reference the string 208 for the portion of the setup menu 112 for the second instance of the device.

As discussed above, the remote firmware setup UI resources 120 utilized by the BMC 106 to generate the OOB firmware setup UI 116 includes string IDs 206 that identify individual configuration settings. However, when multiple instances of the same device reference the same string ID 206 in the manner described above, the BMC 106 is unable to configure each instance of the device separately. Consequently, each instance of the device is configured the same when configured via the OOB firmware setup UI 116 in the manner described above, which may not reflect a user's desired configuration. It is respect to these and other technical challenges that the disclosure presented herein has been made.

Figure 3:
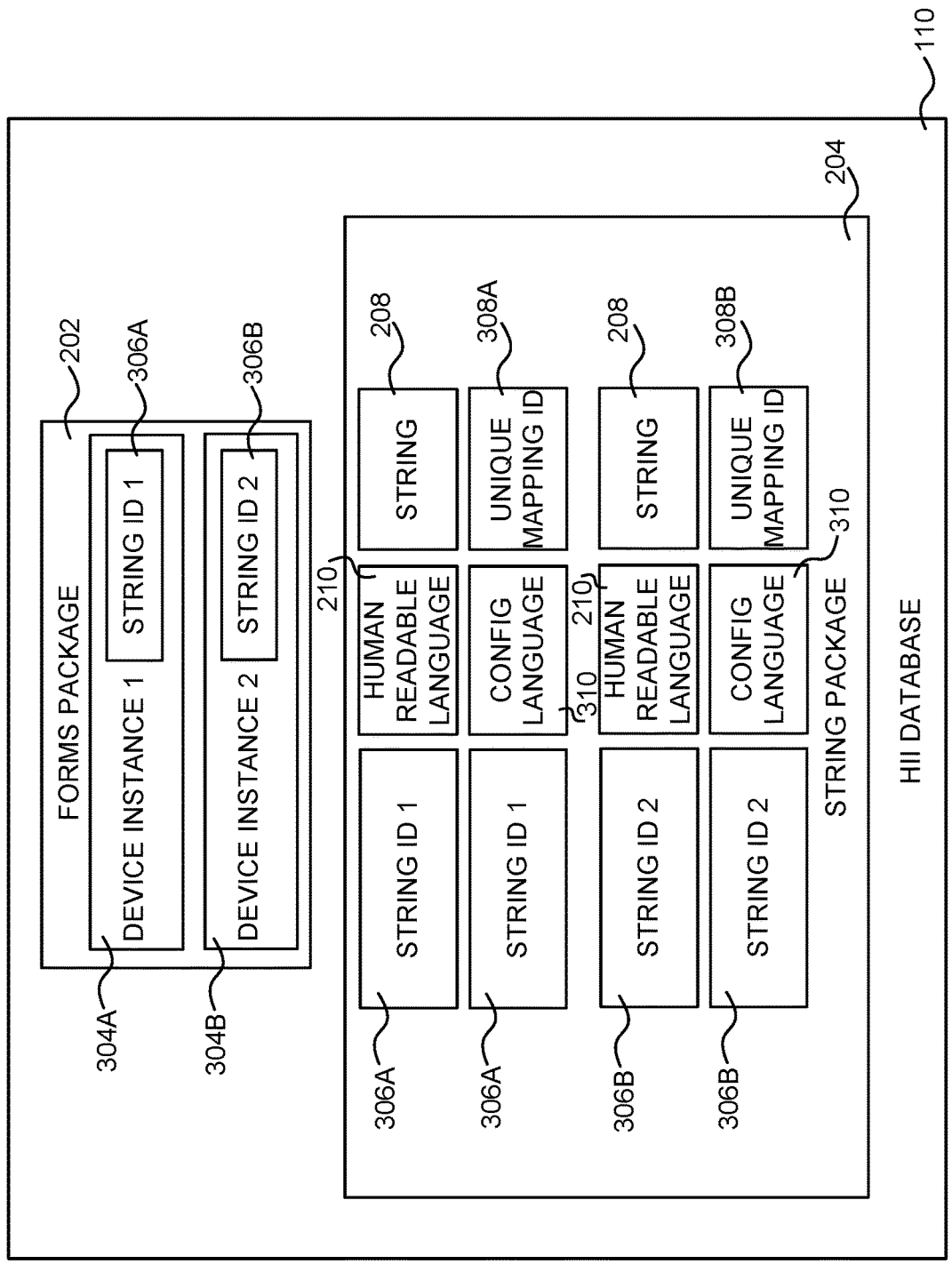
FIG. 3 is a data structure diagram showing the configuration and contents of a an HII database that includes mapping IDs for firmware setup questions, according to one embodiment.

FIG. 3 is a data structure diagram showing the configuration and contents of a an HII database 110 that includes mapping IDs for firmware setup questions, according to one embodiment. In the example shown in FIG. 3, the forms package 202 includes entries 304A and 304B for two separate instances of the same configurable device. In this example, a first unique string ID 306A has been created for the first instance of the device and a second unique string ID 306B has been created for the second instance of the device.

In an embodiment, the new string IDs 306 are created by appending numeric values to the original string IDs associated with the device instances. For example, if the original string ID for a device was "STR_SATA_HOTPLUG," the new string IDs 306 would be "STR_SATA_HOTPLUG 00" and "STR_SATA_HOTPLUG 01." Other mechanisms can be utilized in other embodiments.

In the example shown in FIG. 3, entries in the string package 204 referenced by the original string ID associated with the devices instances are also updated. In particular, the original entry in the string package 204 for the first device instance is updated to reflect the new first unique string ID 306A. A new entry is also created in the string package 204 for the second new unique string ID 306B corresponding to the string 208.

Additionally, a first unique mapping ID 308A is generated for the first device instance and an entry is added to the string package 204 that associates the first unique string ID 306A with the new unique mapping ID 308A. In a similar fashion, a second unique mapping ID 308B is generated for the second device instance and an entry is added to the string package 204 that associates the second unique string ID 306B with the second unique mapping ID 308B.

In an embodiment, the mapping IDs 308 are specified using the UEFI Platform Configuration Language ("x-UEFI-ns"). In addition to string packages 204 associated with human-readable languages, version 2.1 of the UEFI Specification introduced the concept of the UEFI Platform Configuration Language and associated configuration language string packages.

A UEFI Platform Configuration Language string package is similar to a human-readable language string package. Thus, a string ID included in a forms package 202 can be used to retrieve a corresponding string from any of available language packages, including the UEFI Platform Configuration Language string package. Unlike human-language string packages, UEFI Platform Configuration Language strings typically are not displayed within a user-manipulated configuration form.

In the example shown in Table 1, the unique mapping IDs 308 have been defined using the UEFI Platform Configuration Language. As such, the entries in the string package 204 that associate the string IDS 306 with the unique mapping IDs 308 include an entry 310 that specifies that the UEFI Platform Configuration language is the relevant language (e.g., "#language x-UEFI-CRB").

In an embodiment, the unique mapping IDs 308 are alphanumeric strings that identify a device instance or other object for which the value 114 of the corresponding configuration setting can be altered. Table 1, set forth below, shows an example of the entries for several device instances that have been constructed in the manner described above. In the example shown in Table 1, the unique mapping ID 308A for the first device instance is "CRBGF0" and the unique mapping ID 308B for the second device instance is "CRBGF1."

TABLE 1 string STR_SATA_HOTPLUG_00 # language en-US "Hot Plug"
string STR_SATA_HOTPLUG_00 # language x-UEFI-CRB "CRBGF0"
string STR_SATA_HOTPLUG_01 #language en-US "Hot Plug"
string STR_SATA_HOTPLUG_01 # language x-UEFI-CRB "CRBGF1"

The remote firmware setup UI resources 120 described above includes the unique mapping IDs 308. Through the use of the unique mapping IDs 308, the BMC 106 can provide an OOB firmware setup UI 116 that allows a user to modify values 114 for the configuration settings of each device instance separately. To accomplish this, the BMC 106 provides the unique mapping ID 308 for a configuration setting to be modified to the firmware 104 when a request is made through the OOB firmware setup UI 116 to modify the setting.

The firmware 104, in turn, receives the request 122 from the BMC 106 to modify the value 114 of the configuration setting. The firmware 104 determines which setting is to be modified based on the unique mapping ID 308 provided with the request 122 and updates the appropriate value 114 in the non-volatile memory of the computing system 102. Additional details regarding this process will be provided below.

Figure 4:
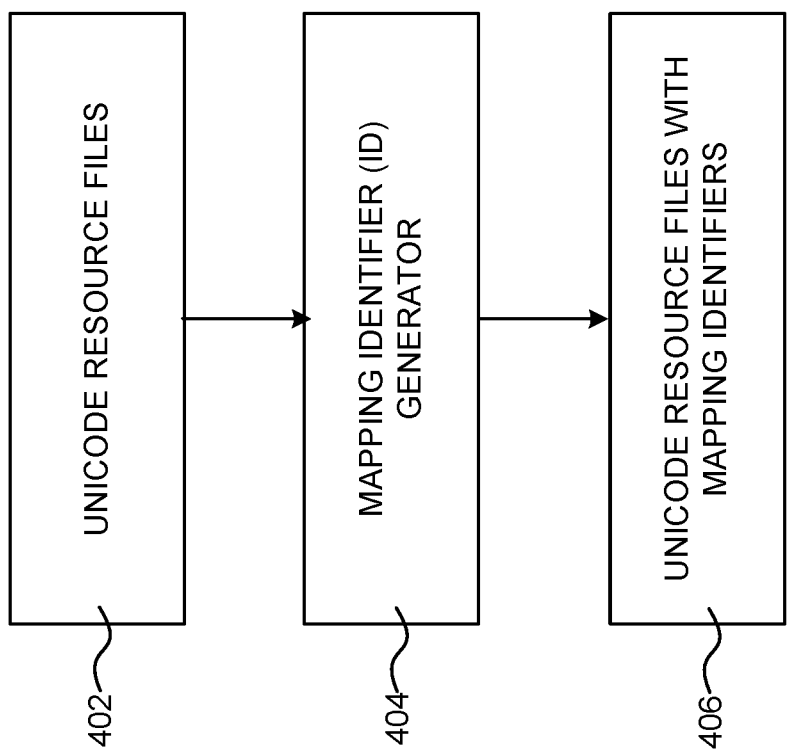
FIG. 4 is a software architecture diagram illustrating aspects of the operation of a mapping ID generator for generating Unicode resource files containing mapping IDs for use in OOB configuration of firmware settings, according to one embodiment.

FIG. 4 is a software architecture diagram illustrating aspects of the operation of a mapping ID generator 404 for generating Unicode resource files 406 containing mapping IDs for use in OOB configuration of firmware settings, according to one embodiment. As discussed briefly above, a mapping ID generator 404 is provided in one embodiment. The mapping ID generator 404 is a software component that takes Unicode resource files 402, such as strings packages 204, and generates new Unicode resource files 402 that include the unique mapping IDs 308 in the manner described above. Additional details regarding the operation of the mapping ID generator 404 is provided below with respect to FIG. 5.

Figure 5:
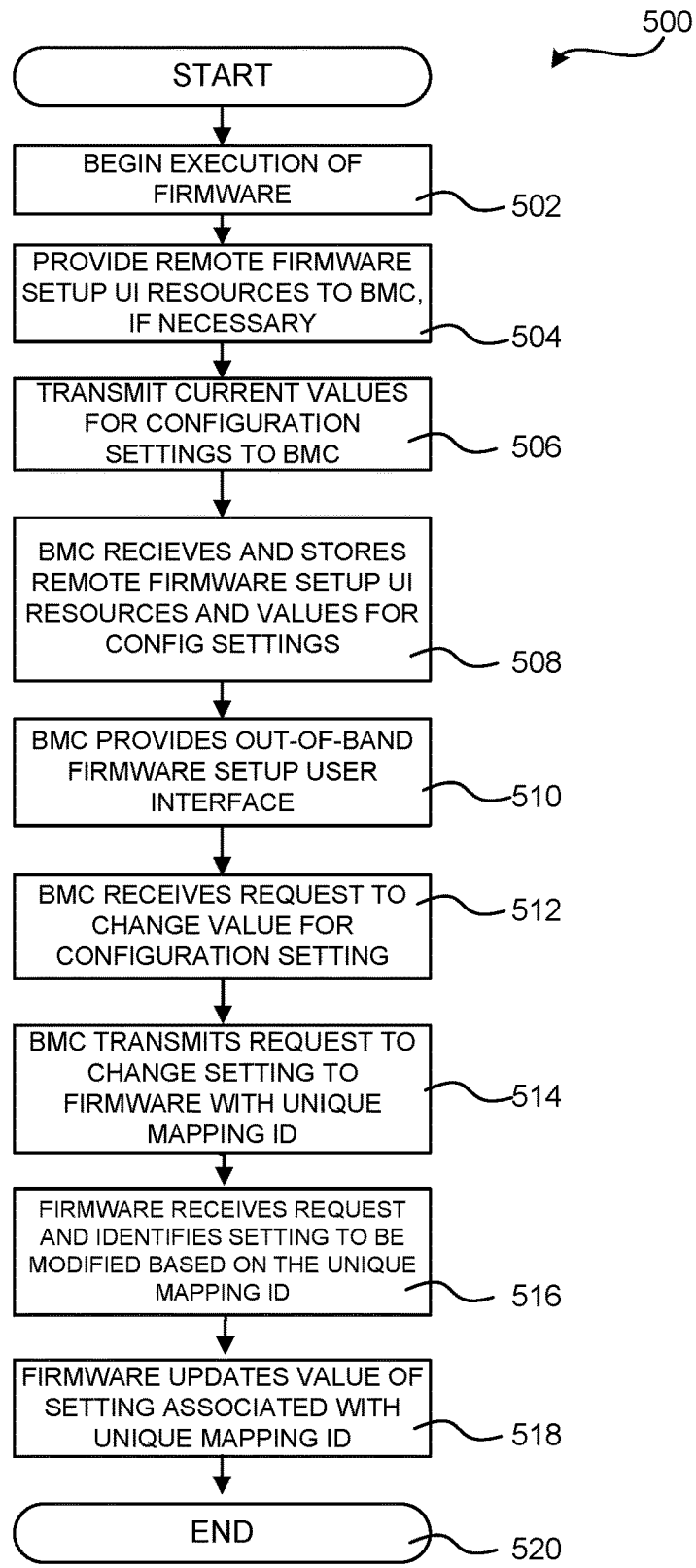
FIG. 5 is a flow diagram showing a routine that illustrates additional aspects of mechanism shown in FIGS. 1-4 for OOB configuration of firmware settings using mapping IDs for firmware setup questions, according to one embodiment disclosed herein.

FIG. 5 is a flow diagram showing a routine that illustrates additional aspects of mechanism shown in FIGS. 1-4 for OOB configuration of firmware settings using mapping IDs for firmware setup questions, according to one embodiment disclosed herein. It is to be appreciated that the logical operations described herein with respect to FIG. 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 500 begins at operation 502, where the firmware 104 begins execution. The routine 500 then proceeds to operation 504, where the firmware 104 provides the remote firmware setup UI resources 120 to the BMC 106, if necessary. It might be necessary to transmit the remote firmware setup UI resources 120 to the BMC 106 following an update to the firmware 104 or if the remote firmware setup UI resources 120 have not been previously provided to the BMC 106.

From operation 504, the routine 500 proceeds to operation 506, where the firmware 104 transmits the current values 114 for the firmware configuration settings to the BMC 106. The BMC 106 receives the remote firmware setup UI resources 120 and the current values of the firmware configuration settings 114 from the firmware 104 and stores these items in a data store at operation 508.

The routine 500 then proceeds from operation 508 to operation 510, where the BMC 106 utilizes the remote firmware setup UI resources 120 and the current values 114 for the firmware configuration settings to provide the OOB firmware setup UI 116 to management clients 118. As discussed above, users of the management clients 118 can utilize the OOB firmware setup UI 116 to provide new values 114 for firmware configuration settings.

From operation 510, the routine 500 proceeds to operation 512 where the BMC 106 receives a new value 114 for the firmware configuration settings by way of the OOB firmware setup UI 116. The routine 500 then proceeds from operation 512 to operation 514, where the BMC 106 transmits a request 122 to the firmware 104 to change the specified value 114 for a firmware configuration setting. As discussed above, the request 122 can include the unique mapping ID associated with the configuration setting to be changed.

From operation 514, the routine 500 proceeds to operation 516, where the firmware 104 receives the request 122 and identifies the configuration setting to be changed based on the unique mapping ID set forth in the request 122. The routine 500 then proceeds to operation 518, where the firmware 104 changes the value 114 of the configuration setting associated with the unique mapping ID with the new value specified in the request 122. The firmware 104 may then initiate a reboot of the computing system 102 in order to apply the changed value. The new value 114 of the configuration setting is utilized to configure the computing system 102 following the reboot. The routine 500 proceeds from operation 518 to operation 520, where it ends.

Figure 6:
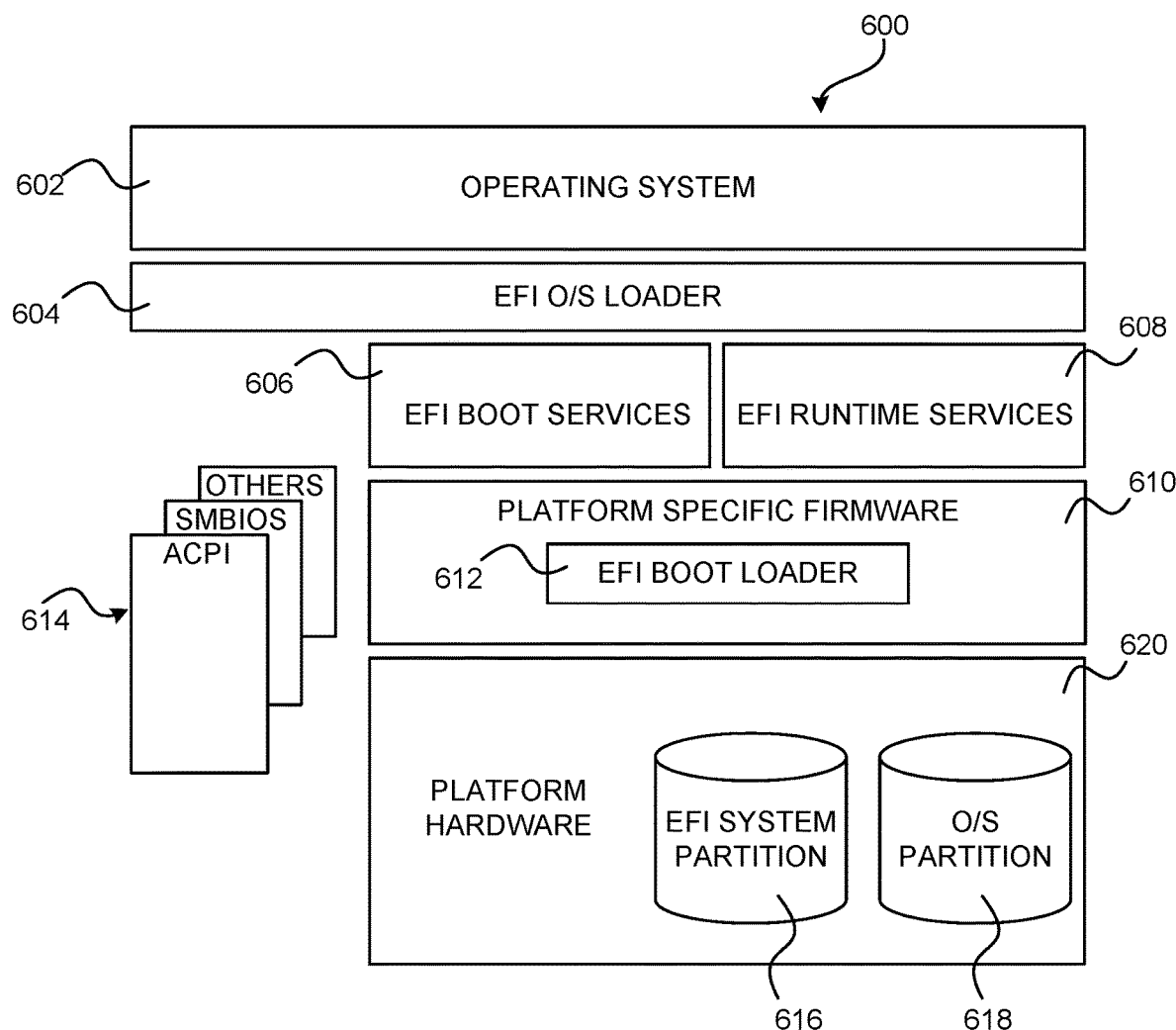
FIG. 6 is a software architecture diagram illustrating a software architecture for a UEFI-compliant firmware that provides an operating environment for aspects of the technologies presented herein in one embodiment.

Turning now to FIG. 6, a software architecture diagram will be described that illustrates an architecture for a UEFI Specification-compliant firmware 600 that can be configured to provide and/or utilize aspects of the technologies disclosed herein. In particular, the firmware architecture shown in FIG. 6 can be utilized to implement the firmware 104 described above. The firmware 104 can also be implemented in other ways in other configurations.

As shown in FIG. 6, the architecture can include platform hardware 620, such as that described below with regard to FIG. 7 and an OS 602. A boot loader 612 for the OS 602 can be retrieved from the UEFI system partition 616 using a UEFI operating system loader 604. The UEFI system partition 616 can be an architecturally shareable system partition. As such, the UEFI system partition 616 can define a partition and file system designed to support safe sharing of mass storage between multiple vendors. An OS partition 618 can also be utilized.

Once started, the UEFI OS loader 604 can continue to boot the complete OS 602. In doing so, the UEFI OS loader 604 can use UEFI boot services 606, an interface to other supported specifications to survey, comprehend, and initialize the various platform components and the operating system software that manages them. Thus, interfaces 614 from other specifications can also be present on the system. For example, the Advanced Configuration and Power Interface ("ACPI") and System Management BIOS ("SMBIOS") specifications can be supported.

UEFI boot services 606 can provide interfaces for devices and system functionality used during boot time. UEFI runtime services 608 can also be available to the UEFI OS loader 604 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the OS 602 and system firmware 600, the Framework is a group of specifications that together describe a firmware implementation that has been designed to perform the full range of operations that are required to initialize a platform from power on through transfer of control to the OS 602. The specifications that make up the Framework, which are also available from INTEL CORPORATION, are also expressly incorporated herein by reference.

Figure 7:
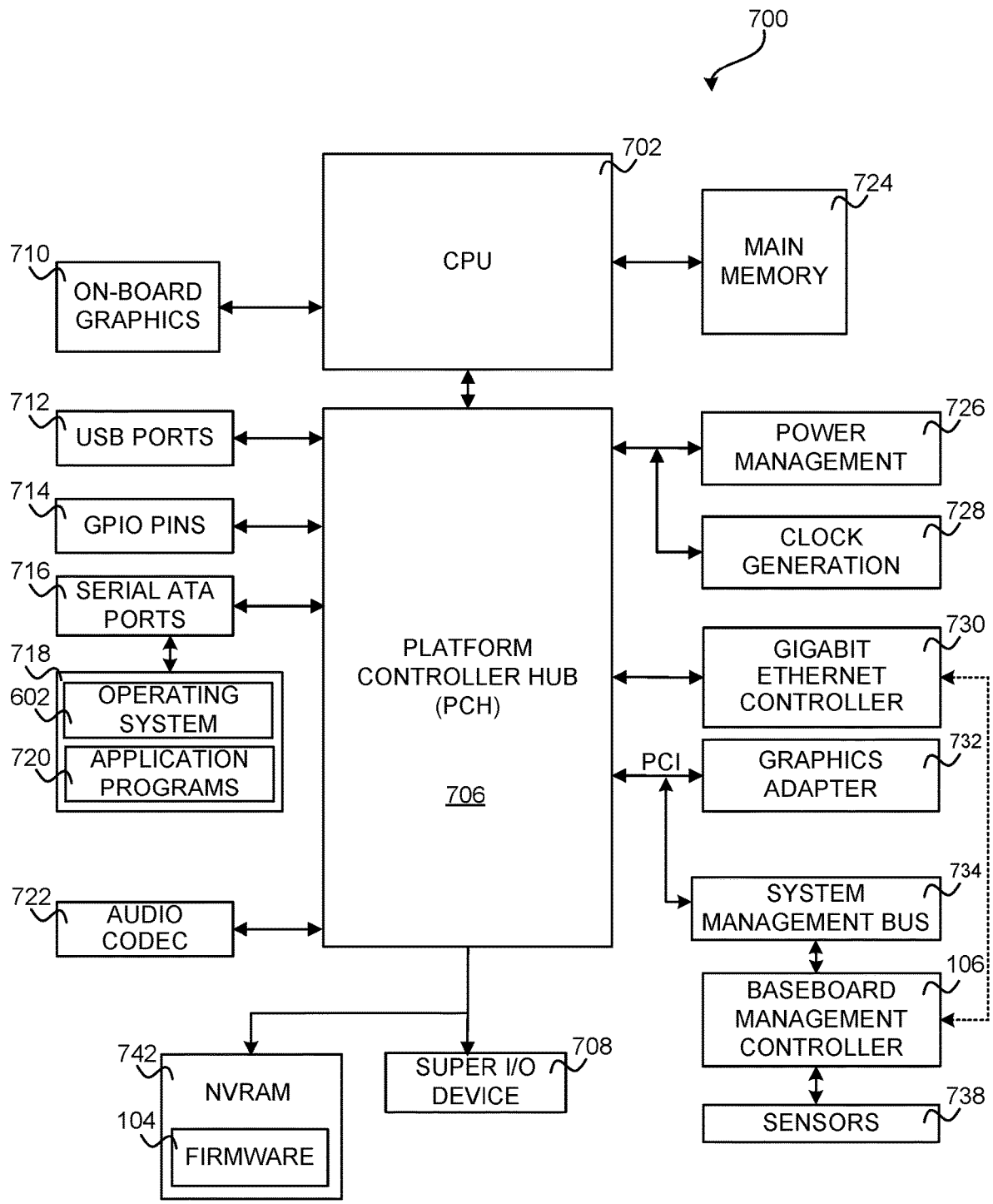
FIG. 7 is a computer architecture diagram that shows an illustrative architecture for a computer that can implement the technologies disclosed herein.

Referring now to FIG. 7, a computer architecture diagram that shows an illustrative architecture for a computer 700 that can provide an operating environment for the technologies presented herein will be described. For example, and without limitation, the computer architecture shown in FIG. 7 can be utilized to implement the computing system 102 and/or any of the other computing systems disclosed herein.

FIG. 7 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 7 shows an illustrative computer architecture for a computer 700 that can be utilized in the implementations described herein. The illustrative computer architecture shown in FIG. 7 includes a baseboard, or "motherboard", which is a printed circuit board to which a multitude of components or devices can be connected by way of a system bus or other electrical communication path. In one illustrative configuration, a central processing unit ("CPU") 702 operates in conjunction with a Platform Controller Hub ("PCH") 706. The CPU 702 is a central processor that performs arithmetic and logical operations necessary for the operation of the computer 700. The computer 700 can include a multitude of CPUs 702. Each CPU 702 might include multiple processing cores. For example, the CPU 702 might be a CPU available from INTEL CORPORATION, AMD CORPORATION, or a CPU based upon the ARM architecture from ARM HOLDINGS. Other types of CPUs might also be utilized.

The CPU 702 provides an interface to a random access memory ("RAM") used as the main memory 724 in the computer 700 and, possibly, to an on-board graphics adapter 710. The PCH 706 provides an interface between the CPU 702 and the remainder of the computer 700.

The PCH 706 can also be responsible for controlling many of the input/output functions of the computer 700. In particular, the PCH 706 can provide one or more universal serial bus ("USB") ports 712, an audio codec 722, a gigabit Ethernet controller 730, and one or more general purpose input/output ("GPIO") pins 714. The USB ports 712 can include USB 2.0 ports, USB 3.0 ports and USB 3.1 ports among other USB ports. The audio codec 722 can include Intel High Definition Audio, Audio Codec '97 ("AC'97") and Dolby TrueHD among others.

The PCH 706 can also include functionality for providing networking functionality through a gigabit Ethernet controller 730 or another type of network controller. The gigabit Ethernet controller 730 is capable of connecting the computer 700 to another computer via a network. Connections which can be made by the gigabit Ethernet controller 730 can include LAN or WAN connections. LAN and WAN networking environments are commonplace in offices, enterprise-wide computer networks, intranets, and the Internet.

The PCH 706 can also provide a bus for interfacing peripheral card devices such as a graphics adapter 732. In one configuration, the bus is a Peripheral Component Interconnect ("PCI") bus, a Peripheral Component Interconnect eXtended ("PCI-X") bus, a Peripheral Component Interconnect Express ("PCIe") bus, or another type of suitable bus for interconnecting the various components shown in FIG. 7.

The PCH 706 can also provide a system management bus 734 for use in managing the various components of the computer 700. Additional details regarding the operation of the system management bus 734 and its connected components are provided below. Power management circuitry 726 and clock generation circuitry 728 can also be utilized during the operation of the PCH 706.

The PCH 706 is also configured to provide one or more interfaces for connecting mass storage devices to the computer 700. For instance, according to one configuration, the PCH 706 includes a serial advanced technology attachment ("SATA") adapter for providing one or more serial ATA ports 716. The serial ATA ports 716 can be connected to one or more mass storage devices storing an OS, such as OS 602 and application programs 720, such as a SATA disk drive 718. As known to those skilled in the art, an OS 602 comprises a set of programs that control operations of a computer and allocation of resources. Application programs are software that runs on top of the OS 602, or other runtime environment, and uses computer resources to perform application specific tasks desired by the user.

According to one configuration, the OS 602 comprises the LINUX operating system. According to another configuration, the OS 602 comprises the WINDOWS operating system from MICROSOFT CORPORATION. According to another configuration, the OS 602 comprises the UNIX operating system or one of its variants. It should be appreciated that other operating systems can also be utilized.

The mass storage devices connected to the PCH 706, and their associated computer-readable storage media, provide non-volatile storage for the computer 700. Although the description of computer-readable storage media contained herein refers to a mass storage device, such as a hard disk drive, it should be appreciated by those skilled in the art that computer-readable storage media can be any available media that can be accessed by the computer 700.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 700.

A low pin count ("LPC") interface can also be provided by the PCH 706 for connecting a Super I/O device 708. The Super I/O device 708 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 742 for storing firmware 104 that includes program code containing the basic routines that help to start up the computer 700 and to transfer information between elements within the computer 700 as discussed above.

It should be appreciated that the program modules disclosed herein, including the firmware 104, can include software instructions that, when loaded into the CPU 702 and executed, transform a general-purpose computer 700 into a special-purpose computer 700 customized to facilitate all, or part of, the operations disclosed herein. As detailed throughout this description, the program modules can provide various tools or techniques by which the computer 700 can participate within the overall systems or operating environments using the components, logic flows, and/or data structures discussed herein.

The CPU 702 can be constructed from any number of transistors or other circuit elements, which can individually or collectively assume any number of states. More specifically, the CPU 702 can operate as a state machine or finite-state machine. Such a machine can be transformed to a second machine, or a specific machine, by loading executable instructions contained within the program modules. These computer-executable instructions can transform the CPU 702 by specifying how the CPU 702 transitions between states, thereby transforming the transistors or other circuit elements constituting the CPU 702 from a first machine to a second machine, wherein the second machine can be specifically configured to perform the operations disclosed herein. The states of either machine can also be transformed by receiving input from one or more user input devices, network interfaces (such as the gigabit Ethernet controller 730), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 724 and/or NVRAM 742. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 706 can include a system management bus 734. As discussed above, when utilized to implement the computing system 102, the system management bus 734 can include a BMC 106. As discussed above, a BMC 106 is a microcontroller that monitors operation of the computer 700. In a more specific configuration, the BMC 106 monitors health-related aspects associated with the computer 700, such as, but not limited to, the temperature of one or more components of the computer 700, speed of rotational components (e.g., spindle motor, CPU fan, etc.) within the computer 700, the voltage across or applied to one or more components within the computer 700, and the available and/or used capacity of memory devices within the computer 700. To accomplish these monitoring functions, the BMC 106 is communicatively connected to one or more components by way of the system management bus 734 in some configurations.

In one configuration, these components include sensor devices 738 for measuring various operating and performance-related parameters within the computer 700. The sensor devices 738 can be either hardware or software based components configured or programmed to measure or detect one or more of the various operating and performance-related parameters.

The BMC 106 functions as the master on the system management bus 734 in some implementations but can also function as a slave in other implementations. Each of the various components communicatively connected to the BMC 106 by way of the system management bus 734 is addressed using a slave address. The system management bus 734 is used by the BMC 106 to request and/or receive various operating, performance-related, and inventory parameters from one or more components, such as the firmware 104, which are also communicatively connected to the system management bus 734.

It should be appreciated that the functionality provided by the computer 700 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 700 might not include all the components shown in FIG. 7, can include other components that are not explicitly shown in FIG. 7, or might utilize an architecture completely different than that shown in FIG. 7.

Based on the foregoing, it should be appreciated that technologies for OOB configuration of firmware settings using mapping IDs for firmware setup questions have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
    transmitting remote firmware setup user interface (UI) resources from a firmware to a baseboard management controller (BMC), the remote firmware setup UI resources comprising a first unique string identifier (ID) for a first instance of a device and a first unique mapping ID associated with the first unique string ID;
    receiving a request from the BMC;
    determining that the request comprises the first unique mapping ID;
    determining that the request comprises a second unique mapping ID;
    responsive to determining that the request comprises the second unique mapping ID, updating a value of a second configuration setting for the firmware based on the request, the second unique mapping ID being associated with the second configuration setting for the firmware; and
    responsive to determining that the request comprises the first unique mapping ID, updating the value of a first configuration setting for the firmware based on the request, the first unique mapping ID being associated with the first configuration setting for the firmware, wherein the remote firmware setup UI resources comprise a second unique string ID for a second instance of the device and the second unique mapping ID associated with the second unique string ID, wherein the first unique mapping ID and the second unique mapping ID are defined using a UEFI Platform Configuration Language.

2. The computer-implemented method of claim 1, wherein the first unique mapping ID and the second unique mapping ID comprise alphanumeric strings identifying a respective device instance or other object for which a value of a corresponding configuration setting can be altered.

3. The computer-implemented method of claim 2, wherein the first unique string ID is generated by appending a first numerical value to an original first unique string ID and wherein the second unique string ID is generated by appending a second numerical value to an original second unique string ID.

4. The computer-implemented method of claim 3, wherein a mapping ID generator generates the first unique mapping ID and the second unique mapping ID based on one or more Unicode resource files.

5. The computer-implemented method of claim 4, wherein the BMC utilizes the remote firmware setup UI resources to generate an out-of-band (OOB) firmware setup UI.

6. A computer-readable storage medium having computer-executable instructions stored thereupon which, when executed by a computing system, cause the computing system to:
    transmit remote firmware setup user interface (UI) resources from a firmware executing on the computing system to a baseboard management controller (BMC), the remote firmware setup UI resources comprising a first unique string identifier (ID) for a first instance of a device and a first unique mapping ID associated with the first unique string ID;
    receive a request from the BMC;
    determine that the request comprises the first unique mapping ID;
    determine that the request comprises a second unique mapping ID;
    responsive to determining that the request comprises the second unique mapping ID, updating a value of a second configuration setting for the firmware based on the request, the second unique mapping ID being associated with the second configuration setting for the firmware; and
    responsive to determining that the request comprises the first unique mapping ID, update the value of a first configuration setting for the firmware stored in a non-volatile memory based on the request, the first unique mapping ID being associated with the first configuration setting for the firmware, wherein the remote firmware setup UI resources comprise a second unique string ID for a second instance of the device and the second unique mapping ID associated with the second unique string ID, wherein the first unique mapping ID and the second unique mapping ID are defined using a UEFI Platform Configuration Language.

7. The computer-readable storage medium of claim 6, wherein the first unique mapping ID and the second unique mapping ID comprise alphanumeric strings identifying a respective device instance or other object for which a value of a corresponding configuration setting can be altered.

8. The computer-readable storage medium of claim 6, wherein the first unique string ID is generated by appending a first numerical value to an original first unique string ID and wherein the second unique string ID is generated by appending a second numerical value to an original second unique string ID.

9. The computer-readable storage medium of claim 8, wherein a mapping ID generator generates the first unique mapping ID and the second unique mapping ID based on one or more Unicode resource files.

10. The computer-readable storage medium of claim 9, wherein the BMC utilizes the remote firmware setup UI resources to generate an out-of-band (OOB) firmware setup UI.

11. A computing system, comprising:
    one or more processors;
    a memory storing a firmware executable on the processors;
    a baseboard management controller (BMC); and
    at least one computer-readable storage medium having computer-executable instructions stored thereupon which, when executed by the one or more processors, cause the computing system to:
    transmit remote firmware setup user interface (UI) resources from the firmware to the BMC, the remote firmware setup UI resources comprising a first unique string identifier (ID) for a first instance of a device and a first unique mapping ID associated with the first unique string ID;
    receive a request from the BMC;
    determine that the request comprises the first unique mapping ID;
    determining that the request comprises a second unique mapping ID;
    responsive to determining that the request comprises the second unique mapping ID, updating a value of a second configuration setting for the firmware based on the request, the second unique mapping ID being associated with the second configuration setting for the firmware; and
    responsive to determining that the request comprises the first unique mapping ID, update the value of a first configuration setting for the firmware based on the request, the first unique mapping ID being associated with the first configuration setting for the firmware, wherein the remote firmware setup UI resources comprise a second unique string ID for a second instance of the device and the second unique mapping ID associated with the second unique string ID, wherein the first unique mapping ID and the second unique mapping ID are defined using a UEFI Platform Configuration Language.

12. The computing system of claim 11, wherein the first unique mapping ID and the second unique mapping ID comprise alphanumeric strings identifying a respective device instance or other object for which a value of a corresponding configuration setting can be altered.

13. The computing system of claim 11, wherein the first unique string ID is generated by appending a first numerical value to an original first unique string ID and wherein the second unique string ID is generated by appending a second numerical value to an original second unique string ID.

14. The computing system of claim 11, wherein a mapping ID generator generates the first unique mapping ID and the second unique mapping ID further based on one or more Unicode resource files.

* * * * *